United States Patent
McLaughlin et al.

(10) Patent No.: US 11,009,840 B2
(45) Date of Patent: May 18, 2021

(54) CONTROL EXECUTION ENVIRONMENT AND CONTAINER BASED ARCHITECTURE

(71) Applicant: HONEYWELL INTERNATIONAL, INC., Morris Plains, NJ (US)

(72) Inventors: Paul McLaughlin, Ambler, PA (US); Joseph Felix, Coopersburg, PA (US); James M. Schreder, Perkasie, PA (US); Michael Waynick, Hatboro, PA (US)

(73) Assignee: Honeywell International, Inc., Charlotte, NC (US)

( * ) Notice: Subject to any disclaimer, the term of this patent is extended or adjusted under 35 U.S.C. 154(b) by 2 days.

(21) Appl. No.: 16/446,090

(22) Filed: Jun. 19, 2019

(65) Prior Publication Data

US 2020/0401089 A1    Dec. 24, 2020

(51) Int. Cl.
 *G06F 9/445*    (2018.01)
 *G05B 15/02*    (2006.01)

(52) U.S. Cl.
 CPC ............. *G05B 15/02* (2013.01); *G06F 9/445* (2013.01)

(58) Field of Classification Search
 None
 See application file for complete search history.

(56) References Cited

U.S. PATENT DOCUMENTS

| | | | |
|---|---|---|---|
| 5,546,301 A | 8/1996 | Agrawl et al. | |
| 6,138,049 A | 10/2000 | McLaughlin et al. | |
| 6,272,386 B1 | 8/2001 | McLaughlin et al. | |
| 7,313,448 B2 | 12/2007 | Detrich et al. | |
| 7,630,777 B2 * | 12/2009 | Rudnick | G05B 15/02 700/11 |
| 9,665,089 B2 | 5/2017 | Schreder et al. | |
| 9,935,828 B2 * | 4/2018 | Tal | H04L 41/0813 |
| 2004/0233237 A1 * | 11/2004 | Randow | G06F 8/34 715/763 |
| 2006/0130021 A1 * | 6/2006 | Plum | G06F 11/3624 717/140 |
| 2008/0015714 A1 * | 1/2008 | Rudnick | G05B 15/02 700/52 |
| 2013/0268799 A1 * | 10/2013 | Mestery | H04L 49/555 714/4.2 |
| 2018/0259923 A1 | 9/2018 | De et al. | |
| 2019/0179678 A1 * | 6/2019 | Banerjee | G06F 9/5072 |
| 2020/0012569 A1 * | 1/2020 | Natanzon | G06F 16/2255 |

OTHER PUBLICATIONS

"Experion CEE-based Controllers and I/O Overview, Doc # EP03-290-400, Release # 400", Jul. 2010, Version 1.0 (retrieved from https://www.nexinstrument.com/assets/images/pdf/TK-PR.pdf on Sep. 4, 2020).*

* cited by examiner

*Primary Examiner* — Philip Wang
*Assistant Examiner* — Rongfa P Wang
(74) *Attorney, Agent, or Firm* — Paschall & Associates, LLC; James C. Paschall; Anthony Miologos

(57) ABSTRACT

In an industrial automation system, a control device adapted to a container-based architecture has been developed. The control device may comprise one or more containers instantiated with control execution application, communication application, and or redundancy management application.

13 Claims, 3 Drawing Sheets

CONTROL EXECUTION ENVIRONMENT AND CONTAINER BASED ARCHITECTURE

TECHNICAL FIELD

This disclosure relates generally to industrial process control and automation systems. More specifically, this disclosure relates to an apparatus and method for adapting control execution, communication, and or redundancy management of control devices to a container-based architecture.

BACKGROUND

Industrial process control and automation systems are typically used to monitor and control complex and potentially volatile industrial processes without interruption, often running without scheduled downtime for years. Over time, a need may arise to upgrade one or more components in an industrial process control and automation system. This could be due to various factors, such as the desire to obtain improvements provided by new products or the need to replace obsolete products or address support issues. When one component of the industrial process control and automation system is upgraded, it is desirable to provide for compatibility with legacy technology. For example, a substantial base of controllers currently used in industrial process control and automation systems currently exists. It may be necessary to upgrade only a portion of existing controllers at a give time. It becomes desirable that the upgraded controllers and the legacy controllers work in harmony together within the industrial process control and automation system. This is especially true in distributed control systems (DCSs) with controllers that provide 1:1 redundancy to improve availability of the system when a primary controller fails. In such a system an upgraded controller may be paired in a redundant setting with a legacy controller. There is a need for upgraded controllers which retain compatibility with legacy controllers for use in industrial process control and automation systems.

SUMMARY

The disclosure is directed to an apparatus comprising: an industrial automation control device comprising a processor; the processor configured to support one or more containers; the one or more containers instantiated with at least one application function selected from control execution, communication, and redundancy management; and a platform supporting container architecture, the platform located in the control device processor. One container may be instantiated with the application functions of control execution and communication and redundancy. The communication application function may include peer communication, supervisory communication, and I/O communication. The platform may be configured to provide communication services to the one or more containers. The platform may be configured to provide scheduler services to the one or more containers. The platform may be configured to provide run time services to the one or more containers. The control execution may be a control execution environment. One container may be instantiated with the application functions of control execution and communication. The application functions may include CEE Control Kernel foreground; CEE Control Kernel background; CEE Control Functions; Control Data Access (CDA) Notification Generator: CDA Responder Object Adapter; CDA Initiator Object Adapter; 110 Manager; and CEE Redundancy Management.

The disclosure is also directed to a method comprising: packaging at least one of a control execution application, a communication application, and a redundancy management application as one or more containers; deploying the one or more containers in an industrial process automation control device; and operating the industrial process automation control device using a platform supporting container architecture and the one or more containers. The control execution application, the communication application, and the redundancy management application may be packaged as one container. The platform supporting container architecture may provide communication services, scheduler services, run time services, redundancy management services, or any combination thereof to the one or more containers. The control execution application may be a control execution environment application. One container may be instantiated with the application functions of control execution and communication. The application functions may include CEE Control Kernel foreground; CEE Control Kernel (CK) background: CEE Control Functions; Control Data Access (CDA) Notification Generator; CDA Responder Object Adapter; CDA Initiator Object Adapter; I/O Manager: and CEE Redundancy Management.

The disclosure is also directed to a method of upgrading a control device in an industrial automation system comprising replacing at least one of: an embedded control execution application with a container instantiated with a control execution application; an embedded communication application with a container instantiated with a communication application; an embedded redundancy management application with a container instantiated with redundancy management application; or any combination thereof wherein the applications are instantiated in one or more containers. The method may further comprise supporting the one or more containers by a platform of the control device, the platform capable of supporting container architecture. The supporting provided by the platform to the container may include providing communication services, scheduler services, run time services, redundancy management services, or any combination thereof to the one or more containers. The method may further comprise instantiating proprietary information in at least one container. The upgrading may involve no rewriting of control logic.

DETAILED DESCRIPTION

FIGS. 1 through 3b, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Industrial automation is an important feature of today's industrial processing plants. There is a need for industrial automation systems to continually provide greater flexibility in the implantation and operation of industrial automation systems.

Figure 1:
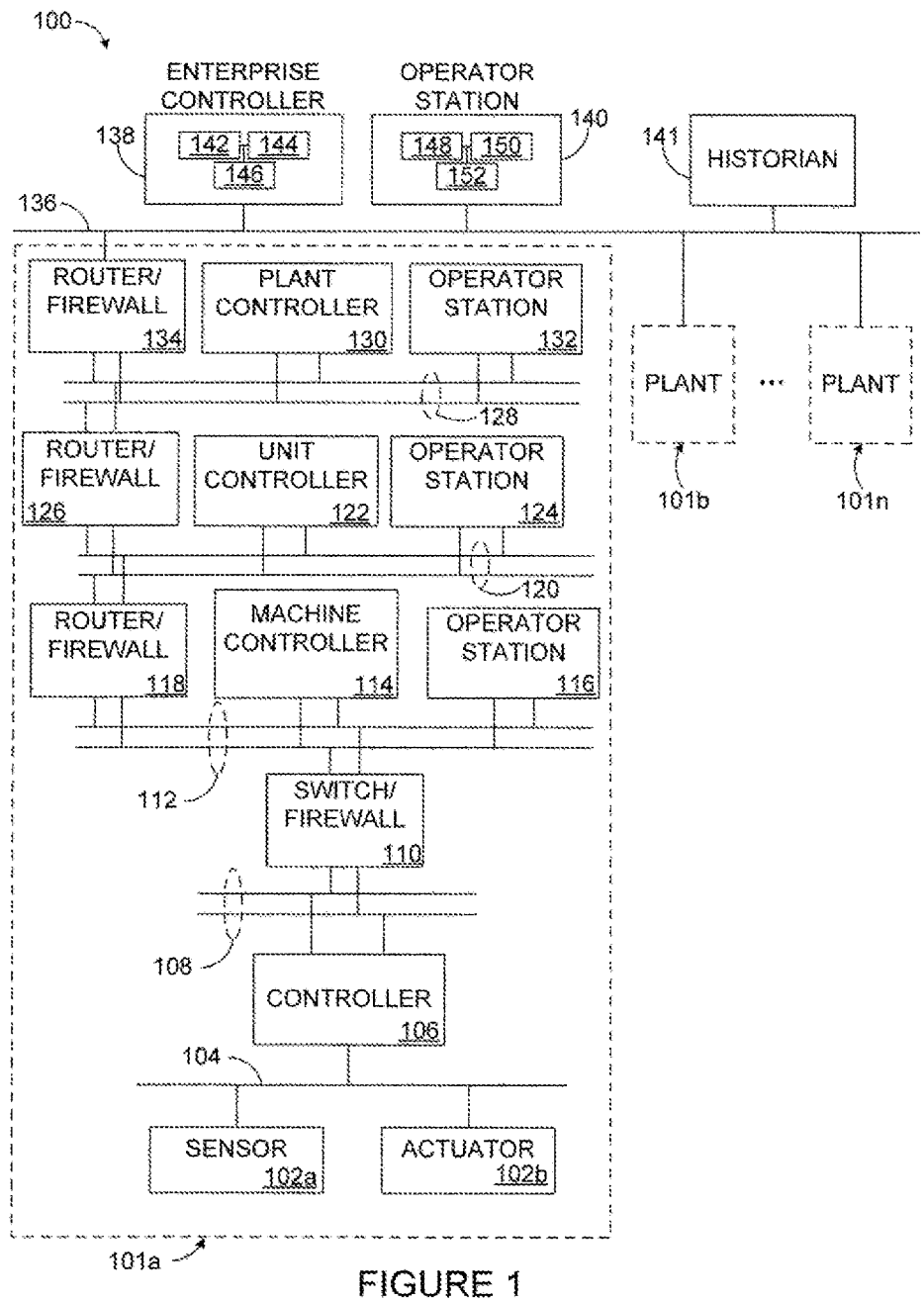
FIG. 1 illustrates an industrial process control and automation system.

FIG. 1 illustrates an example industrial automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102 a and one or more actuators 102 b. The sensors 102 a and actuators 102 b represent components in a process system that may perform any of a wide variety of functions. For example, the sensors 102 a could measure a wide variety of characteristics in the process system, such as temperature, pressure; or flow rate. Also; the actuators 102 b could alter a wide variety of characteristics in the process system. The sensors 102 a and actuators 102 b could represent any other or additional components in any suitable process system. Each of the sensors 102 a includes any suitable structure for measuring one or more characteristics in a process system. Each of the actuators 102 b includes any suitable structure for operating on or affecting one or more conditions in a process system. The sensors and actuators may be generally referred to as field devices.

At least one network 104 is coupled to the sensors 102 a and actuators 102 b. The network 104 facilitates interaction with the sensors 102 a and actuators 102 b. For example, the network 104 could transport measurement data from the sensors 102 a and provide control signals to the actuators 102 b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102 a to control the operation of one or more actuators 102 b. For example, a controller 106 could receive measurement data from one or more sensors 102 a and use the measurement data to generate control signals for one or more actuators 102 b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102 a and controlling one or more actuators 102 b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CFO) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102 a, and actuators 102 b, which could be associated with a particular piece of industrial equipment (such as a boiler or other machine). For example, the machine-level controllers 114 could log information collected or generated by the controllers 106, such as measurement data from the sensors 102 a or control signals for the actuators 102 b. The machine-level controllers 114 could also execute applications that control the operation of the controllers 106, thereby controlling the operation of the actuators 102 b. In addition, the machine level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102 a, and actuators 102 b).

One or more operator stations 116 are coupled to the networks 112. The operator stations 116 represent computing or communication devices providing user access to the machine-level controllers 114, which could then provide user access to the controllers 106 (and possibly the sensors 102 a and actuators 102 b). As particular examples, the operator stations 116 could allow users to review the operational history of the sensors 102 a and actuators 102 b using information collected by the controllers 106 and/or the machine-level controllers 114. The operator stations 116 could also allow the users to adjust the operation of the sensors 102 a, actuators 102 b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102 $a$, and actuators 102$b$).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101 $a$-101 $n$, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101 $a$-101 $n$ and to control various aspects of the plants 101 $a$-101 $n$. The enterprise-level controllers 138 can also perform various functions to support the operation and control of components in the plants 101 $a$-101 $n$. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101 $a$ is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

Over time, a need or desire to upgrade one or more components in an industrial process control and automation system develops. This is true for distributed control system (DCS) operations as well as other systems. With the substantial base of Installed automation devices already existing in numerous industrial process control and automation systems there is a need to adapt existing automation devices that were developed for OS (operating system) task or process/thread-based architecture to more modern architecture. An example of modern architecture is software container architecture, which is a form of virtualization that allows for greater granularity and segmentation of software modules, thereby improving reliability, security, resources utilization, and engineering efficiency.

Containers in container architecture provides isolation within which applications can be instantiated and executed. Typically, containers virtualize CPU, memory, storage, and network resources at the OS-level, thereby providing a sandboxed view of the OS logically isolated from other applications. Container architecture is applied herein to control devices employed in industrial automation systems. In industrial automation systems, unique requirements exist due to the very nature of industrial process automation systems compared to, for example, traditional information technology systems. For example, real time execution requirements and highly deterministic requirements must be met for industrial automation systems. Further, control devices are often resource limited, such as limited memory and limited CPU, and resource utilization is a concern. In industrial automation systems, care must be taken as to how a container may be engineered and deployed into the system. Additionally, not only does a container and its instantiated applications need to be considered, but also the management and platform that supports the container. It is envisioned that some functions may be deployed and executed as containers, while other functions may be deployed and executed using different architecture, such as the existing architecture of an existing control device. Some applications may need intimate access to the hardware and there may be advantages to maintain a different architecture for these functions. However, other functions in the same control device may adapt to the container architecture.

Employing one or more containers in a control device allows the applications instantiated in the container to be abstracted from the hardware. Many industrial automation applications today run on the firmware of control devices. Moving applications to a container architecture allows for the container to run on available hardware in the control device, even if that hardware is different from control device to control device. The container architecture is flexible and may operate on the hardware that is available. Upon instantiating an application as a container, the application then becomes portable. Replication across multiple control devices becomes manageable.

Applying container architecture to control devices in an industrial automation system includes instantiating at least one of the following applications as a container: control execution algorithm, communication algorithm and or redundancy control algorithm. Each of the listed algorithms may be built, packaged, and instantiated as a separate container, or any combination of the listed algorithms may be bunt, packaged and instantiated as a single container. The container is implemented and executed in the control device. The existing control logic of the industrial control automation system need not be re-written, and operators can migrate to a new control device with enhanced capability without having to rewrite the control logic. Additionally, pre-existing control models may be adapted to containers without the control model being re-written Employing containers creates a more flexible control device able to move to next-generation type capabilities and provide a viable migration path. For example, Internet of things (IoT) applications such as alarm management, analytics, advanced process control (APC) may be moved to the edge or embedded in the control device in a sale and secure manner.

Containers further provide the opportunity to use a variety of software modules in the control device. Purchased software modules may be employed and not all require custom coding and generation. In existing control devices, adapting to a container architecture provides the opportunity for software modules to be incorporated even though previously only software was that embedded in the control device by, for example, the manufacturer, could be available. Further, proprietary information may be deployed in a contain thus preserving the confidential nature of the proprietary information. Migration to a new controller may occur without the need to re-write control logic. The flexibility of the control device is increased while at the same time the run time provided by the control device is preserved. The preservation of run time is important because of the limited resources typically found in existing processors of control devices. At the same time, containers provide isolation so proprietary modules may be employed using a container and then deployed while at the same time maintaining the confidentiality of the proprietary module. The benefit of the proprietary software is achieved on an existing control device while maintaining the secrecy of the proprietary software. Containers further provide a new method to simplify with greater granularity on-process software upgrades and migrations. Control automation software may be packaged and tested and then be available to run on different types of control devices as needs arise.

The container architecture may be utilized in DCS operations with the control execution and redundancy that are unique to DCS, Programable logic control (PLC) systems have control engines and redundancy that are different from that in a DCS.

The container is abstracted away from the operating system and the hardware. Therefore, to execute applications instantiated as container, the control device needs to have a platform able to service and support container architecture. The platform is the infrastructure holding the containers. Of the existing control devices, a portion of control devices have such platforms and would be eligible to adaptation to a container architecture. New control devices can be designed to support container architecture and be designed with a suitable platform to support the containers. The platform would provide resources supporting the containers, especially those functions that have been abstracted from the container. The platform provides the container run time and virtualization services to the containers. Any platform that supports the container run time may be used to support the containers described herein.

For example, the platform would need to provide communication services. The platform would also need to provide scheduler services to ensure that the process execution exercising the control functions operates in a real time manner. The platform would need to provide communication services between two or more containers running on the same hardware platform. On a given controller, there may be more than one container. Each container provides isolation but at the same time, the applications may need to communicate with one another. The platform provides such communication services. The platform is the container run time onto which the containers are deployed. The container is associated with the platform and the platform provides the services to start the container, stop the container, schedule the container and so on.

In one embodiment, the control engine, such as control execution environment (CEE), that is currently present in today's control devices and operated with previous architecture is now packaged and instantiated as a container and deployed with the platform in the control device. In another embodiment, the control function and a communication application layer are packaged as a stand-alone modular container. In a particular control device such as the Honeywell C300 control device, the control function is CEE. Redundancy management may be included in the container so that each control container is monolithic and drives to its own atomic cleanpoint. At a more detailed level and with reference to CEE, a container may be packaged with CEE Control Kernel foreground; CEE, Control Kernel (CK) background (parameter access task): CEE Control Functions: Control Data Access (CDA); Notification Generator; CDA Responder Object Adapter; CDA Initiator Object Adapter; I/O Manager; and CEE Redundancy Management.

Communications, including peer, supervisory, and are included in either the container or the platform, as discussed above, so that control execution containers can communicate with each other whether on the same node or on different physical nodes using an application communication layer such as Control Data Access (CDA), Universal Control Network Communication (UNCA) or (OPC UA). Further, the control execution notification generator, which provides alarms and events, needs to execute in proximity with the control functions. Also, the I/O management includes shed management, I/O initialization on hot, warm, and cold start, output distribution in coordinated coherent manner to prevent retrograde outputs and proper loop latency and other timing management.

Figure 2A:
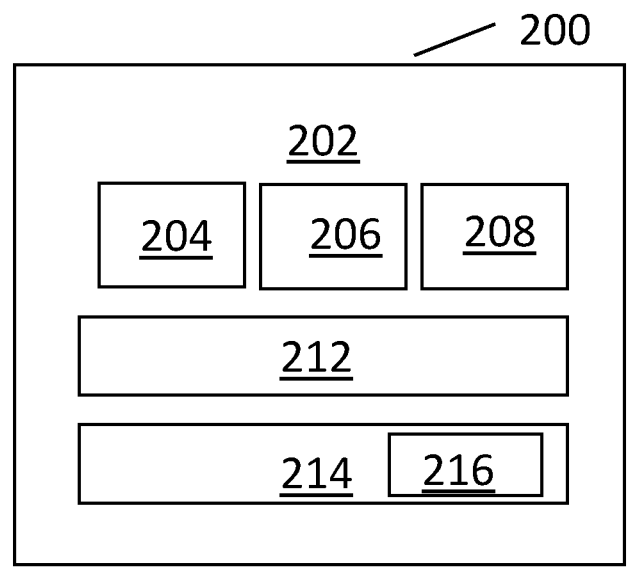
FIGS. 2a and 2b show exemplary container-based architecture of a control device.
Figure 2B:
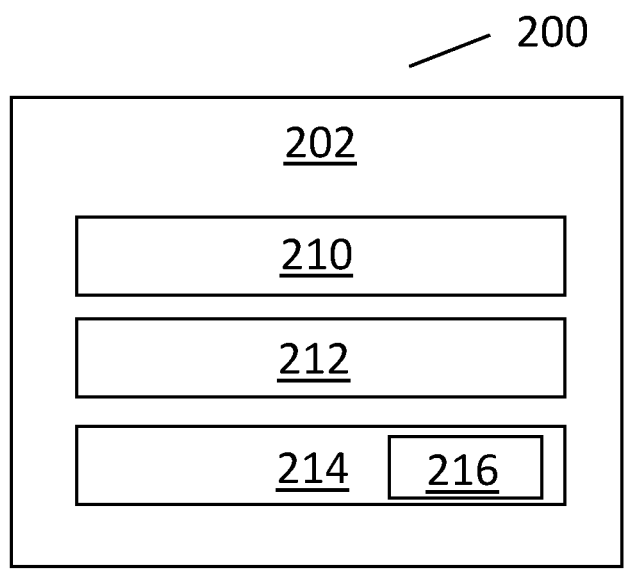

Turning to FIG. 2a, control device 200 has processor 202 having infrastructure 214 including microprocessor, memory and network interface 216, and platform 212 where platform 212 supports and services container architecture. FIG. 2a shown an embodiment comprising three containers 204, 206, and 208. Each container 204, 206, 208 may have separate instantiated applications. For example, container 204 is instantiated with at least control execution, container 206 is instantiated with at least communication, and container 208 is instantiated with at least redundancy management. FIG. 2b shows control device 200 having processor 202 in turn having infrastructure 214 and platform 212 where platform 212 supports and services container architecture. In one embodiment, platform 212 is configured to provide one of communication services, scheduler services, or redundancy management services to the container(s). In another embodiment, platform 212 provides communication services, scheduler services, and redundancy management services to the container(s). However, FIG. 2b shows an embodiment where a single container 210 is instantiated with multiple applications. For example, in one embodiment container 210 is instantiated with the application functions of control execution and communication and redundancy.

Figure 3:
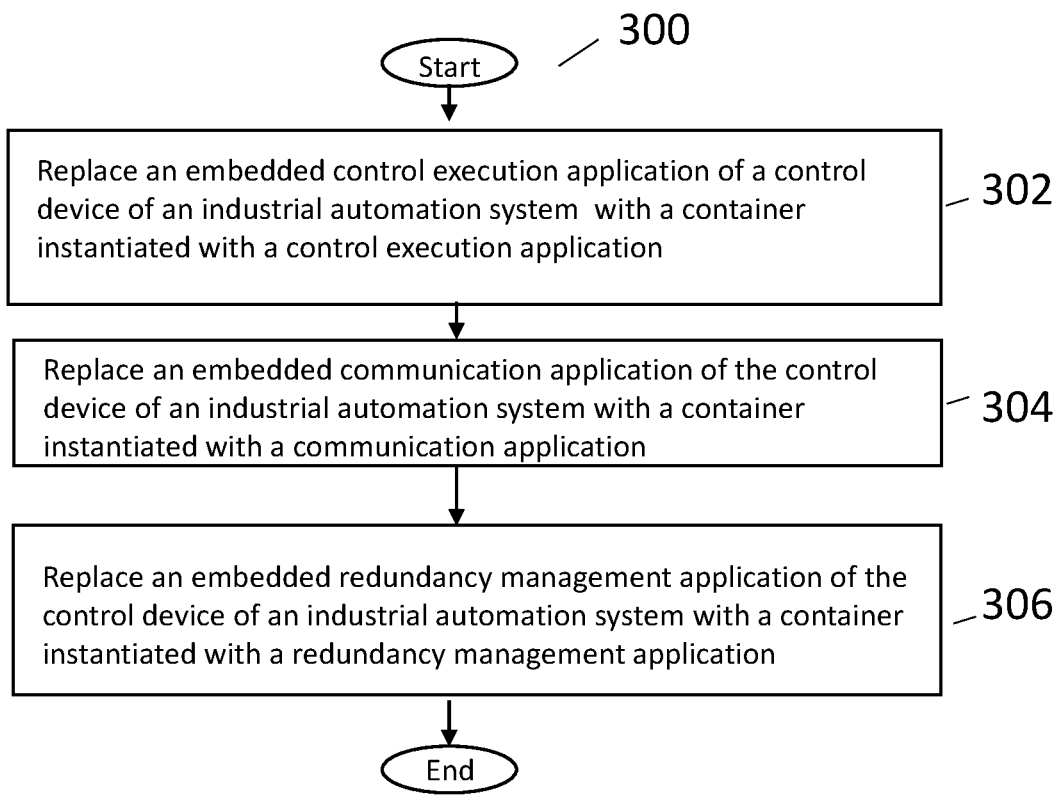
FIG. 3 shows a method of upgrading a control device in an industrial automation system.

Turning to FIG. 3, a method 300 of upgrading a control device of an industrial automation system is shown. The method involves replacing an embedded control execution application of a control device of an industrial automation system with a container instantiated with a control execution application in step 302. Replacing an embedded communication application of the control device of an industrial automation system with a container instantiated with a communication application is shown in step 304. Replacing an embedded redundancy management application of the control device of an industrial automation system with a container instantiated with a redundancy management application is shown in step 406. The steps may be performed in any order and one or more of the steps may be performed at the same time.

EMBODIMENTS

A first embodiment is an apparatus comprising: an industrial automation control device comprising a processor; the processor configured to support one or more containers; the one or more containers instantiated with at least one application function selected from control execution, communication, and redundancy management; and a platform supporting container architecture, the platform located in the control device processor.

Another embodiment is the apparatus of the first embodiment wherein one container is instantiated with the application functions of control execution and communication and redundancy.

Another embodiment is the apparatus of the first embodiment wherein the communication application function includes peer communication, supervisory communication, and I/O communication.

Another embodiment is the apparatus of the first embodiment wherein the platform is configured to provide communication services to the one or more containers.

Another embodiment is the apparatus of the first embodiment wherein the platform is configured to provide scheduler services to the one or more containers.

Another embodiment is the apparatus of the first embodiment wherein the platform is configured to provide run time services to the one or more containers Another embodiment is the apparatus of the first embodiment wherein the control execution is a control execution environment.

Another embodiment is the apparatus of the first embodiment wherein one container is instantiated with the application functions of control execution and communication.

Another embodiment is the apparatus of the first embodiment wherein the application functions include CEE Control Kernel foreground; CEE Control Kernel background; CEE Control Functions; Control Data Access (CDA) Notification Generator; CDA Responder Object Adapter; CDA initiator Object Adapter; I/O Manager; and CEE Redundancy Management.

A second embodiment is a method comprising: packaging at least one of a control execution application, a communication application, and a redundancy management application as one or more containers; deploying the one or more containers in an industrial process automation control device; and operating the industrial process automation control device using a platform supporting container architecture and the one or more containers.

Another embodiment is the method of the second embodiment wherein the control execution application, the communication application, and the redundancy management application are packaged as one container.

Another embodiment is the method of the second embodiment wherein the platform supporting container architecture provides communication services, scheduler services, run time services, redundancy management services, or any combination thereof to the one or more containers.

Another embodiment is the method of the second embodiment wherein the control execution application is a control execution environment application.

Another embodiment is the method of the second embodiment wherein one container is instantiated with the application functions of control execution and communication.

Another embodiment is the method of the second embodiment wherein the application functions include CEE Control Kernel foreground; CEE Control Kernel (CK) background; CEE Control Functions: Control Data Access (CDA) Notification Generator; CDA Responder Object Adapter; CDA Initiator Object Adapter; I/O Manager; and CEE Redundancy Management.

A third embodiment is a method of upgrading a control device in an industrial automation system comprising replacing at least one of: an embedded control execution application with a container instantiated with a control execution application; an embedded communication application with a container instantiated with a communication application; an embedded redundancy management application with a container instantiated with redundancy management application; or any combination thereof wherein the applications are instantiated in one or more containers.

Another embodiment is the method of the third embodiment further comprising supporting the one or more containers by a platform of the control device, the platform capable of supporting container architecture.

Another embodiment is the method of the third embodiment wherein the supporting provided by the platform to the container includes providing communication services, scheduler services, run time services, redundancy management services, or any combination thereof to the one or more containers.

Another embodiment is the method of the third embodiment further comprising instantiating proprietary information in at least one container.

Another embodiment is the method of the third embodiment wherein the upgrading involves no rewriting of control logic.

What is claimed is:

1. An apparatus comprising:
   a. an industrial automation control device comprising a processor;
      i. the processor configured to support one or more containers;
      ii. the one or more containers instantiated with at least one application function selected from control execution, communication, and redundancy management, wherein one container is instantiated with an application functions of control execution and communication and redundancy and wherein the application functions include Control Execution Environment (CEE) Control Kernel foreground; CEE Control Kernel background; CEE Control Functions; Control Data Access (CDA) Notification Generator; CDA Responder Object Adapter; CDA Initiator Object Adapter; I/O Manager; and CEE Redundancy Management; and
   b. a platform supporting container architecture, the platform located in the control device processor.

2. The apparatus of claim 1 wherein one container is instantiated with the application functions of control execution and communication and redundancy.

3. The apparatus of claim 1 wherein the communication application function includes peer communication, supervisory communication, and I/O communication.

4. The apparatus of claim 1 wherein the platform is configured to provide communication services to the one or more containers.

5. The apparatus of claim 1 wherein the platform is configured to provide scheduler services to the one or more containers.

6. The apparatus of claim 1 wherein the platform is configured to provide run time services to the one or more containers.

7. The apparatus of claim 1 wherein the control execution is a control execution environment.

8. The apparatus of claim 1 wherein one container is instantiated with the application functions of control execution and communication.

9. A method comprising:
   a. packaging at least one of a control execution application, a communication application, and a redundancy management application as one or more containers;
   b. deploying the one or more containers in an industrial process automation control device, wherein one container is instantiated with an application functions of control execution and communication and wherein the application functions include Control Execution Environment (CEE) Control Kernel foreground; CEE Control Kernel (CK) background; CEE Control Functions; Control Data Access (CDA) Notification Generator; CDA Responder Object Adapter; CDA Initiator Object Adapter; I/O Manager; and CEE Redundancy Management; and
   c. operating the industrial process automation control device using a platform supporting container architecture and the one or more containers.

10. The method of claim 9 wherein the control execution application, the communication application, and the redundancy management application are packaged as one container.

11. The method of claim 10 wherein the platform supporting container architecture provides communication services, scheduler services, run time services, redundancy management services, or any combination thereof to the one or more containers.

12. The method of claim 10 wherein the control execution application is a control execution environment application.

13. The method of claim 10 wherein one container is instantiated with the application functions of control execution and communication.

* * * * *